United States Patent [19]

Vuckovich et al.

[11] 4,438,382
[45] Mar. 20, 1984

[54] THREE PHASE AC MOTOR CONTROLLER

[75] Inventors: Michael Vuckovich, Elizabeth; Maynard K. Wright, Bethel Park; John P. Burkett, South Huntington Township, Westmoreland County, all of Pa.

[73] Assignee: The United States of America as represented by the Department of Energy, Washington, D.C.

[21] Appl. No.: 279,501

[22] Filed: Jun. 30, 1981

[51] Int. Cl.³ .............................................. H02P 3/20
[52] U.S. Cl. .................................... 318/744; 318/763
[58] Field of Search ............... 318/744, 757, 763, 764, 318/739, 373, 294, 612, 756

[56] References Cited

U.S. PATENT DOCUMENTS

| | | | |
|---|---|---|---|
| 3,541,418 | 11/1970 | Agin et al. | 318/612 |
| 3,568,020 | 3/1971 | Lisi | 318/756 |
| 3,612,972 | 10/1971 | Konig | 318/739 |
| 3,781,621 | 12/1973 | Blackburn | 318/373 |
| 4,088,938 | 9/1978 | Baker | 318/744 |
| 4,290,000 | 9/1981 | Sun | 318/294 |

OTHER PUBLICATIONS

Murphy; J. M. D., *Thyristor Control of AC Motors*, Pergamon Press, 1973, pp. 154–158.

*Primary Examiner*—David Smith, Jr.
*Attorney, Agent, or Firm*—Z. L. Dermer

[57] ABSTRACT

A motor controller for a three phase AC motor (10) which is adapted to operate bidirectionally from signals received either from a computer (30) or a manual control (32). The controller is comprised of digital logic circuit means which implement a forward and reverse command signal channel (27, 29) for the application of power through the forward and reverse power switching relays (16, 18, 20, 22). The digital logic elements are cross coupled to prevent activation of both channels simultaneously and each includes a plugging circuit (65, 67) for stopping the motor upon the removal of control signal applied to one of the two channels (27, 29) for a direction of rotation desired. Each plugging circuit (65, 67) includes a one-shot pulse signal generator (88, 102) which outputs a single pulse signal of predetermined pulsewidth which is adapted to inhibit further operation of the application of power in the channel which is being activated and to apply a reversal command signal to the other channel which provides a reversed phase application of power to the motor for a period defined by the pulse-width output of the one-shot signal generator to plug the motor (10) which will then be inoperative until another rotational command signal is applied to either of the two channels.

4 Claims, 1 Drawing Figure

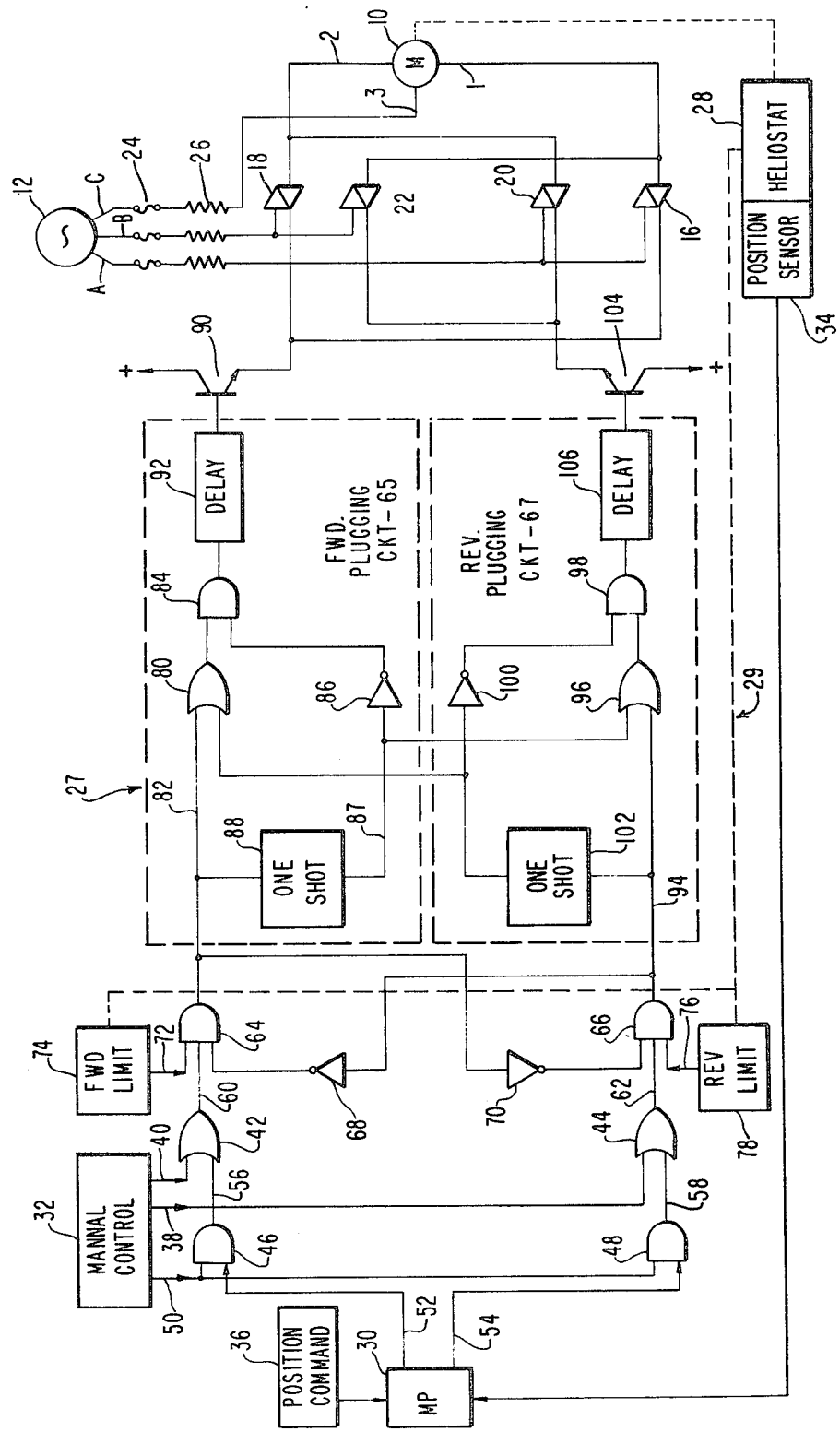

THREE PHASE AC MOTOR CONTROLLER

GOVERNMENT CONTRACT

The present invention was made in the performance of Government Contract No. 83-2729D from Sandia National Laboratories.

BACKGROUND OF THE INVENTION

The present invention relates to alternating current motor control systems and more particularly to a bidirectional rotation control system including plugging for braking.

Quick stopping or reversal of rotation of three phase induction motors by the method known as plugging is well known and consists of applying three phase power having a reserved phase sequence to the stator of the machine while the motor is still running.

It is an object of the present invention, therefore, to provide an improved bidirectional motor controller for AC motors.

It is another object of the present invention to provide an improved motor controller for AC motors which utilizes the method of plugging for braking the motor.

A further object of the present invention is to provide improved AC motor controller that can be controlled either automatically by computer or manually.

Yet a further object of the invention is to provide a bidirectional motor controller which utilizes semiconductor logic gates to control the application of three phase power to the motor during both the running and braking mode of operation.

SUMMARY OF THE INVENTION

These and other objects are achieved by means of an AC motor controller comprised of respective forward and reverse control signal channels for controlling the application of power through power switching means to an AC motor which rotates in either one of two desired directions with cross coupling means to prevent activation of both channels at the same time, and wherein each signal channel also includes a plugging circuit for stopping the motor upon the removal of an input control signal to one of the two control channels. Each plugging circuit, moreover, includes a one-shot circuit which is cross coupled to the opposite control signal channel to enable application of reversed phase power to the motor for a predetermined time period corresponding to the output of the one-shot circuit to quickly stop the motor while at the same time inhibiting further operation of its own control channel.

BRIEF DESCRIPTION OF THE DRAWING

The drawing is an electrical block diagram illustrative of the preferred embodiment of the subject invention.

DESCRIPTION OF THE PREFERRED EMBODIMENT

Referring now to the drawing, there is disclosed a three phase AC motor controller including a three-phase AC motor 10 which is adapted to receive power from a three-phase electrical source 12. The motor 10 is adapted to operate in both the forward and reverse direction by two pairs of solid state relays, one pair of which 16 and 18 couples phases A and B to the motor in a first phase sense for forward rotation, while the second pair 20 and 22 reverse the phase connections of A and B to the motor 10 for reverse rotation. Phase C is connected to the motor in a non-switched connection. This latter connection results from the fact that in order to reverse the operation of the three phase motor it is only required to reverse any two phase lines. As shown in the FIGURE, each of the power phase lines A, B and C also includes respective fuses 24 and current limiting resistors 26 which merely provide protective circuit means in accordance with conventional practice.

The solid state relays 16, 18, 20, and 22 are well known devices, a typical example being a type D4812 solid state relay manufactured by the International Rectifier Corporation. Such relays are optically coupled by means, not shown, to isolate the high power voltage for the motor 10 from a low power operating signal applied thereto. In addition, these devices also incorporate zero crossing circuitry to minimize power line noises.

In the subject invention the three phase motor 10 is adapted to mechanically drive a device which, for example, comprises a heliostat 28 and which is required to be driven to a predetermined position in space for being oriented to sunlight. The circuit shown in the figure is adapted to drive the heliostat 28 along one of the two orthogonal axes with the other axes being implemented by a second identical circuit, not shown. Thus two control circuits would be required to drive the heliostat in the elevation and azimuth directions.

The motor controller of the subject invention as shown in the drawing utilizes control logic circuit means implemented in a forward and reverse control signal channel configuration 27 and 29 which receives either forward or reverse command input signals from a microprocessor 30 or a manual control unit 32. The microprocessor 30 provides an output as a result of error signals being generated from a comparison of the output of one or more positioned sensors 34 and the output from a device 36 inputting a position command. The manual control unit 32 is comprised of a plurality of manually operated switches, not shown, which respectively provide forward and reverse command signal on lines 38 and 40. These signals are coupled to OR gates 42 and 44 which additionally receive an output from AND gates 46 and 48. The AND gates 46 and 48 have one of their inputs connected to manual select line 50 from the manual control unit 32 while their other inputs are respectively connected to the forward command input line 52 and the reverse command input line 54 from the microprocessor 30. The manual select line 50 is adapted to provide the same digital logic level as that outputted from the microprocessor 30 during its automatic operational mode so that one of the AND gates 46 and 48 is enabled to provide a logic output either on line 56 or line 58 depending upon the motor direction required. Accordingly, the OR gate 42 outputs either a computer forward command or a manual forward command on line 60 while the OR gate 44 will output either a computer reverse command or manual reverse command signal on line 62.

Following the OR gates 42 and 44 are a pair of three input AND gates 64 and 66 which have one of their respective inputs cross coupled by means of logic signal inverters 68 and 70. The second input to the gates 64 and 66 comprises the logic output from the OR gates 42 and 44, respectively, which appear on leads 60 and 62. The third input to AND gate 64 comprises a forward limit signal appearing on line 72 from a forward limit switch 74 while the third input to the corresponding AND gate 66 comprises a signal from the line 76 applied from a reverse limit switch 78. The forward and reverse limit switches 74 and 78 provide an inhibiting signal when the heliostat 28 reaches predefined limits of travel in the forward and reverse direction. The cross coupling of the two AND gates 64 and 66 by means of the logic inverters 68 and 70 provides an enabling input to AND gate 64 when the output of AND gate 66 is inhibited while the reverse is true when AND gate 64 is inhibited and the gate 66 is enabled. Thus only one of the AND gates 64 and 66 can output a command signal at any one time and thus both signal 27 and 29 channels are prevented from outputting a command simultaneously. Accordingly if forward rotation of the motor 10 is desired, AND gate 64 will couple a control signal to OR gate 80 via line 82 where it is next applied to one input of an AND gate 84 also having an input coupled to a logic inverter 86 coupled to the output of a one-shot signal generator circuit 88. During the time that the one-shot circuit 88 is inoperative, the logic inverter 86 will provide an enabling signal to the AND gate 84 which couples a turn on signal to drive transistor 90 through a delay circuit 92. Upon being rendered conductive, transistor 90 operates solid state relays 18 and 20 to couple phases A and B of the three power source 12 to motor leads 1 and 2 to cause the motor to rotate in the forward direction.

In the event that reverse rotation of the motor 10 is desired, AND gate 66 outputs a reverse command on line 94 where it is applied to the OR gate 96 which is coupled to one input of the AND gate 98 and is enabled by means of the logic inverter 100 coupled to the one-shot circuit 102 which is not energized by the appearance of the command signal on line 94. The output of the AND gate 98 is coupled to a drive transistor 104 which becomes conductive to activate solid state relays 20 and 22 which connects phase A to motor lead 2 while phase B of the power source 12 is connected to motor lead 1. Since motor lead 3 is continuously connected to phase C, the required phase reversal of two input phases occurs and the motor will rotate in the reverse direction. The delay circuits 92 and 106 are provided in order that the previously energized pair of relays can turn off before the other pair is turned on, thus delay circuit 92 is adapted to assure the turn off of solid state relays 20 and 22 prior to the turn on of solid state relay 16 and 18.

Considering now the braking mode of operation, if the motor 10 is running in the forward direction and stopping is required, the input command either from the microprocessor 30 or the manual control unit 32 is removed from the OR gate 42 whereupon the logic output of the AND gate 64 changes its binary output level. This action triggers the one-shot circuit 88 included in the forward plugging circuit 65 which generates an output pulse for a predetermined time of pulsewidth which is coupled to the OR gate 96 and the logic inverter 86 via line 87. The output of the logic inverter 86 inhibits the AND gate 84, causing transistor 90 to become non-conductive which has the effect of turning off the solid state relays 16 and 18. The OR gate 96, however, upon receiving the one-shot signal causes AND gate 98 and the delay circuit 106 to turn on transistor 104 which energizes solid state relays 20 and 22 for the one-shot pulse time period which is designed to apply a sufficient deceleration torque to stop the motor in less than one revolution. The action of the logic inverter 86 inhibiting AND gate 84 insures that the system will not accept a forward command signal while the motor is being plugged. Reverse plugging is achieved through the reverse plugging circuit 67 by having one-shot circuit 102 triggered whereupon transistor 90 will become temporarily conductive to turn on the solid state relays 16 and 18 for the time of the pulsewidth output from the one-shot circuit 102. As noted, the delay circuits 92 and 106 operate to insure the turn off of the respective solid state relay pair before energizing the other pair. Accordingly, the proper operation of the forward and reverse plugging circuits 65 and 67 require that the output pulse from the one-shot circuits 88 and 102, respectively, must be greater than the delay times of the delay circuits 92 and 106.

Thus what has been shown and described in a three phase AC motor controller which automatically stops the motor when a rotational control input signal is removed whereupon plugging the motor for a predetermined time period is provided by a one-shot circuit which generates a control signal which commands the application of power to the motor in a reverse phase sense for the time period dictated by the pulsewidth output of the particular one-shot circuit triggered.

Having thus shown and described what is at present considered to be the preferred embodiment of the invention, it should be noted that the foregoing detailed description has been made by way of explanation and not limitation and therefore all alterations, modifications and changes coming within the spirit and scope of the invention are herein meant to be included.

We claim:

1. A motor controller for applying power to a reversible multiphase AC motor through power switch means which are adapted to reverse the phase excitation of the motor in both a running and braking mode of operation, comprising in combination:

forward and reverse command signal means;

first and second cross coupled logic circuit means respectively implementing forward and reverse command signal channels coupled between said command signal means and said power switch means, wherein each of said first and second logic circuit means comprises means for mutually exclusively coupling a first control signal to said power switch means to effect a predetermined direction of rotation of said motor and respective plugging circuit means for braking said motor, said plugging circuit means including pulse signal generator means becoming operable in response to a predetermined logic signal level of said first control signal to output a second control signal of a predetermined pulsewidth to inhibit further operation of the logic circuit means of the respective signal channel for duration of the pulsewidth of said second control signal and thereby deactivate said power switch means for said predetermined direction of rotation and additionally coupling said second control signal to the logic circuit means of the other signal channel to reactivate said power switch means for the opposite direction of rotation for the duration of the pulsewidth of said second control signal which causes said motor to brake, wherein each logic circuit means additionally includes first and second tandemly connected multi-input logic gates, said logic gates having the output of said first logic gate coupled to one input of said second logic gate and wherein one input of said first logic gate is coupled to said first control signal, said pulse signal generator means of the other signal channel being coupled to another input of said first logic gate for coupling its respective second control signal thereto, and additionally including circuit means coupled from the output of said pulse signal generator means of the respective signal channel to another input of said second logic gate of the respective signal channel to enable said second logic gate when the pulse generator means of the respective signal channel is inoperative, said second logic gate thereby coupling said first control signal to said power switch means but becoming inhibited upon said pulse signal generator means of the respective signal channel being triggered to deactivate said power switch means for said predetermined direction of rotation, and wherein said first logic gate of each logic circuit means comprises an OR gate and said second logic gate comprises an AND gate, and additionally including logic inverter means coupling the output of said signal generator means of the respective signal channel to said another input of said AND gate.

2. The motor controller as defined by claim 1 and additionally including driver circuit means in each signal channel coupled between the output of the respective AND gate to said power switch means.

3. The motor controller as defined by claim 2 and additionally including a time delay circuit means in each signal channel coupled between said AND gate and said driver circuit means.

4. The motor controller as defined by claim 3 wherein said pulse signal generator means in each signal channel comprises a one-shot pulse signal generator providing an output pulse having a pulsewidth which is greater than the time delay provided by said time delay circuit means.

* * * * *